(12) United States Patent
Maggi et al.

(10) Patent No.: US 7,882,876 B2
(45) Date of Patent: Feb. 8, 2011

(54) SNOW CHAIN ATTACHMENT SYSTEM COMPRISING ELASTIC FASTENING MEANS

(75) Inventors: Giuseppe Maggi, Lecco (IT);
Jean-Pierre Bouvier, Le Mont sur Lausanne (CH)

(73) Assignee: Maggi Catene S.p.A., Olginate (Lecco) (IT)

( * ) Notice: Subject to any disclaimer, the term of this patent is extended or adjusted under 35 U.S.C. 154(b) by 58 days.

(21) Appl. No.: 11/911,019

(22) PCT Filed: Jan. 26, 2006

(86) PCT No.: PCT/IB2006/050290

§ 371 (c)(1),
(2), (4) Date: Oct. 9, 2007

(87) PCT Pub. No.: WO2006/106441

PCT Pub. Date: Oct. 12, 2006

(65) Prior Publication Data

US 2008/0223496 A1    Sep. 18, 2008

(30) Foreign Application Priority Data

Apr. 6, 2005   (IT)  ................... MI2005A0573

(51) Int. Cl.
*B60C 27/12* (2006.01)
(52) U.S. Cl. .................................. 152/218; 152/225 R

(58) Field of Classification Search ............... 152/179, 152/185, 217, 218, 225 R, 226, 216
See application file for complete search history.

(56) References Cited

U.S. PATENT DOCUMENTS

| | | | |
|---|---|---|---|
| 3,016,079 A | | 1/1962 | Weller |
| 5,012,848 A | * | 5/1991 | Metraux ..................... 152/218 |
| 5,033,522 A | * | 7/1991 | Metraux ................. 152/213 A |
| 5,147,479 A | * | 9/1992 | Koshi et al. ................. 152/216 |
| 5,582,662 A | * | 12/1996 | Pribysh ...................... 152/216 |
| 6,802,349 B2 | * | 10/2004 | Kahlbacher ............. 152/225 R |
| 7,380,578 B2 | * | 6/2008 | Maggi et al. ................ 152/216 |
| 2005/0284555 A1 | * | 12/2005 | Maggi et al. ................ 152/217 |

FOREIGN PATENT DOCUMENTS

| | | |
|---|---|---|
| EP | 0 313 520 | 4/1989 |
| JP | 63 145111 | 6/1988 |

* cited by examiner

*Primary Examiner*—Russell D Stormer
(74) *Attorney, Agent, or Firm*—Young & Thompson

(57) ABSTRACT

An attachment system for a snow chain is disclosed, comprising a rolling track (1, 2a, 2b, 12) joined to a plurality of connecting arms (3) converging towards a common central structure (4), wherein a plurality of elastic ropes (5) forming elastic attachments between said plurality of connecting arms (3) and an anchoring ring (7) fixed to a rim (C) of a wheel, and wherein at least an inextensible linear element (9) is further provided, which may be engaged with or disengaged from a working position in which it is apt to replace the elastic attachment of at least one of said elastic ropes (5) with an inextensible attachment.

18 Claims, 2 Drawing Sheets

SNOW CHAIN ATTACHMENT SYSTEM COMPRISING ELASTIC FASTENING MEANS

FIELD OF THE INVENTION

Figure 1:
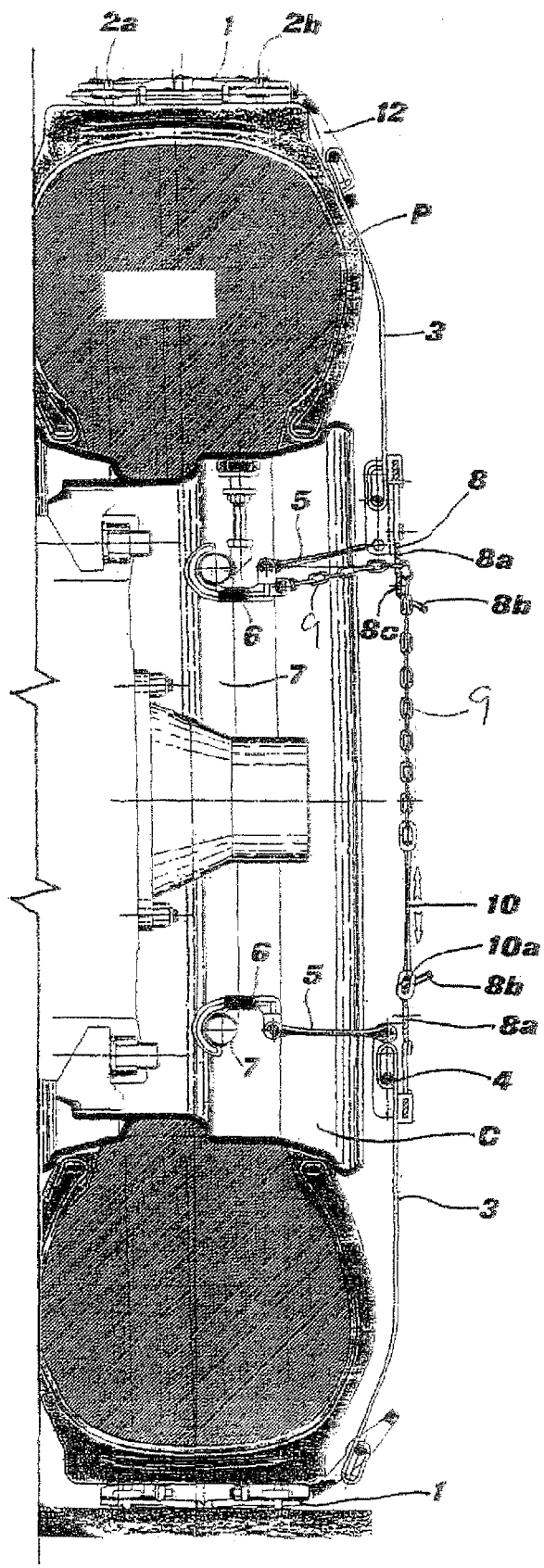

The present invention refers to an improved snow chain attachment system for lorries, in particular to a radial-arm snow chain.

BACKGROUND ART

As known, variously-shaped anti-skid devices or snow chains exist for vehicles. In the present disclosure, we shall deal with those devices—greatly appreciated today, due to a series of advantageous peculiarities—which may be applied and fixed to the front of the wheel, without having to act also on the rear side of the tire.

These semi-automatic fitting chains are provided with an anti-skid rolling track equipped with anti-skid elements (portions of metal chain, metal cross bars, spiked plates, and so on), intended to lie between the tire and the road surface to ensure road grip, which track is held on the tire by connecting arms or spokes.

The connecting arms, which have a varying degree of flexibility, are further attached to the vehicle wheel by variously-shaped retaining means.

A particularly critical and demanding application field, in which this kind of chain is advantageous, is that of lorry tires. In this respect, reference can be made to EP 313.520.

Particularly for this application, two specific problems become relevant: one concerns the system fitting the device to the wheel, and the other concerns the ability for adjustment of the chain to the tire size. In the present application, the former problem will be addressed, while the latter is addressed in a separate application having the same priority date.

The attachment system described in EP 313.520 is extremely effective and convenient in applications having large-diameter wheels and a recessed rim, typically the wheels of large lorries.

In particular, in the currently marketed version of that chain, the attachment system of the rolling track consists of a series of arms (typically six) which are radially hinged outwardly of rigid plates of the rolling track and, radially inwardly, to a polygonal connecting structure (typically a hexagonal one). This last structure may further be attached, by means of elastic ropes, to a rigid attachment ring, removably fixed on the inside of the wheel rim.

This arrangement is extremely convenient for mounting the snow chain because, once the attachment ring has been installed, the snow chain can be quickly attached to the wheel simply by placing it close to the wheel front side and by then stretching the individual elastic ropes until they engage, by means of suitable hook terminals, with the attachment ring.

Also during operation, this arrangement allows a slight adjustment and circumferential movement of the snow chain on the tire, preventing the establishment of undesired tensions.

All that contributes to the success of this product, which is available from the Applicant under the well-known trademark TRAK®.

However, it has been detected that also this product has room for improvement. In particular, it has been detected that in very specific conditions, for example when driving along sharp bends, shear stresses between tread and road surface become relevant, which tend to push the snow chain outwards, causing it to come off the tire. These pushing action is opposed by the elastic retaining force of the elastic ropes which, however, may be insufficient to prevent the chain from being pushed excessively outwards, ending up becoming detached from the tire, with imaginable consequences.

It is hence an object of the present invention to overcome this disadvantage by providing a snow chain for lorries as in the pre-characterising portion of claim 1, which may nevertheless be more safely attached to the tire.

Such object is achieved by means of a system as described in its essential features in the enclosed main claim.

Other inventive aspects of the device are described in the dependent claims.

Figure 2:
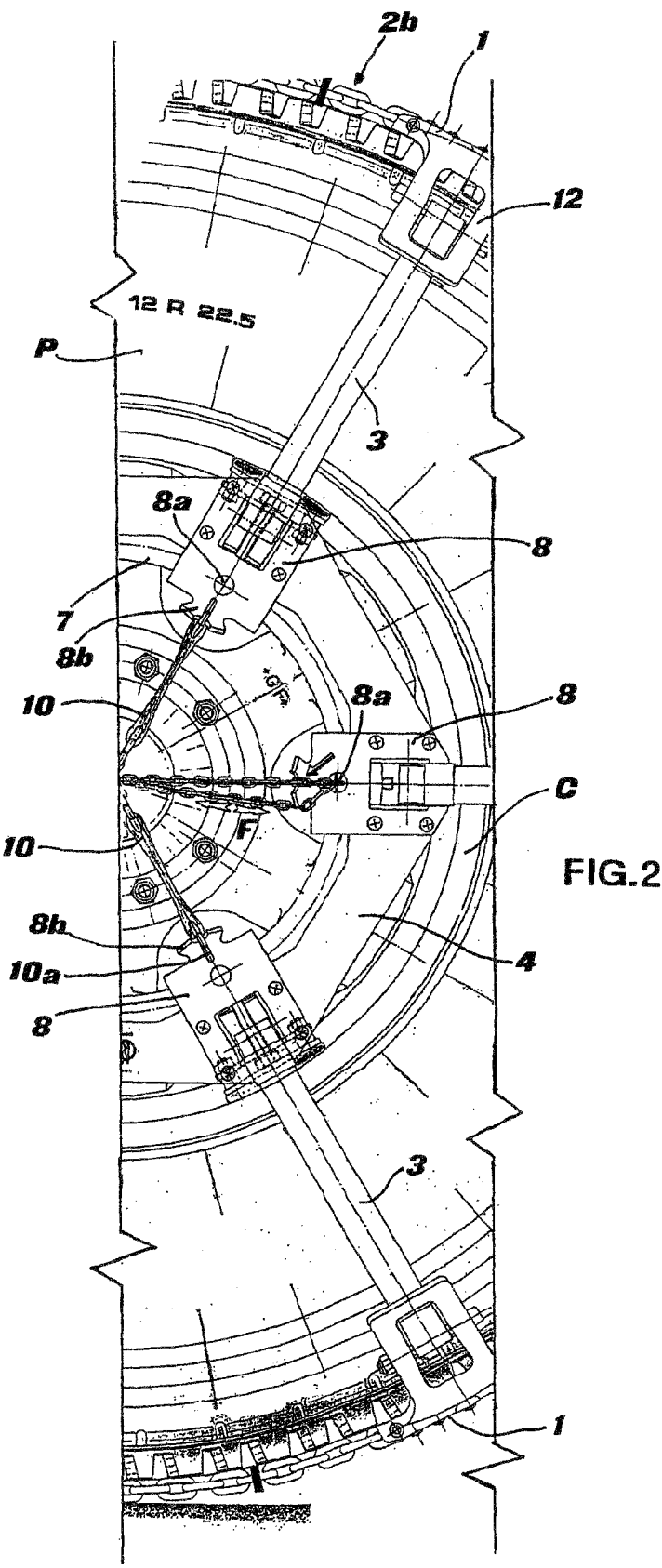

Further features and advantages of the system according to the invention will in any case be more evident from the following detailed description of a preferred embodiment, given by way of example and illustrated in the accompanying drawings, wherein:

FIG. 1 is a cross-section view of an exemplary tire on which the snow chain of the invention is mounted; and FIG. 2 is an interrupted front elevation view of the chain of FIG. 1.

FIG. 1 shows an exemplary snow chain mounted on a lorry tire P. In the drawing, spiked plates 1 are identified, from which two lengths of metal chain 2a and 2b depart, forming an anti-skid rolling track. From each plate 1, a side attachment extension 12 further depends, whereto a connecting arm 3 is joined, which converges towards the rotation axis of tire P. In the embodiment shown, six plates 1 are provided with an equal number of connecting arms 3.

The radial inner ends of all connecting arms 3 are further hinged, in a way known per se, to a common central hexagonal structure 4.

From central structure 4, elastic ropes 5 equipped with end hooks 6 depart in turn, at the point of junction to arms 3. The elastic ropes 5 create tension to hold the arms 3 inward toward the central axis of the wheel.

End hooks 6 are intended to be fastened, by stretching elastic ropes 5, to a rigid ring 7, provisionally fixed (at least during the winter season) on the inside of wheel rim C.

According to the invention, guiding plates 8 are further fixed on central structure 4, in proximity of elastic ropes 5, which extend radially towards the inside with a portion intended for the passage and fastening of a small metal chain 9.

In particular, said portion for the passage and fastening of plate 8 has a through-hole 8a and a fork 8b, the latter being raised from the plane of plate 8, equipped with a second hole 8c.

As mentioned, a small metal chain 9 is further provided which is fastened, at a first end, to one of terminal hooks 6 and, at a second end, to an elastic holding element 10.

The arrangement of central structure 4 and of the corresponding plates 8 is such that, for each opposite pair of plates 8, a small attachment chain 9 is provided with its corresponding elastic holding element 10. In the specific case illustrated, there are hence 3 small chains arranged radially and mutually angularly equidistant. In particular, each small chain 9 extends from its hook 6, passes through hole 8a of plate 8 adjacent thereto, passes through its respective fork 8b, runs across the center axis of the wheel and becomes fastened, by means of the elastic element 10, to the fork 8b of the opposite plate. For such purpose, according to the embodiment shown, the elastic element 10 can be anchored to a plate 8 by means of a metal link 10a which is introduced across fork 8b and in the hole 8c of such plate and permanently closed thereon.

During operation, it is envisaged that the chain be mounted on the tire in a traditional manner, i.e. by placing arms 3 to the tire front and by stretching elastic ropes 5 until end hooks 6 may be engaged with rigid ring 7. In this step, the small chains 9 are kept out of fork 8c, so that they remain loose and free to slide within their corresponding hole 8a, as shown by double arrow F in FIG. 2.

Once the snow chain has been mounted in position, small chains 9 are displaced into the fork 8b, introducing a link from its edge, so that the adjacent cross links cannot pass through the fork and hence represent an impediment for the free sliding of the small chain. In this step, it is preferable to impart a certain pressure upon the arms, in order to move the central structure 4 closer to the wheel rim, by exploiting the elasticity of arms 3: thereby, small chain 9 is taut and ensures that, even after the vehicle has resumed its motion, when the chain fully fits on the tire, arms 3 still remain suitably deflected and can impart a continuous elastic push to the rolling track, even if the rigidity constraint of the small chain replaces the elastic action of ropes 5.

Once the chain has been fully mounted on the tire, elastic holding element 10 does not have a critical function, but mainly serves to keep the small chain taut—and hence securely engaged with fork 8*b*—and to prevent the small chain from rattling during wheel rotation.

Conversely, since small chains 9 are locked on their corresponding forks 8*b*, the distance between plate 8 and the corresponding end hook 6 is rigidly defined, despite the elasticity of the attachment represented by the elastic rope 5.

Therefore, even assuming an action is produced which pushes and drives the rolling track down and away from the front side of the wheel, in the above-described conditions, the rigidity of the attachment consisting of small chains 9 prevents the snow chain from coming off the tire.

The object set forth in the preliminary remarks has thereby been fully achieved. As a matter of fact, thanks to the attachment system comprising both elastic ropes 5 and small chains 9, it is possible to preserve ease of mounting of the snow chain, however avoiding that the inherent elasticity of ropes 5 allows the snow chain to accidentally come off the tire.

However, it is intended that the invention is not limited to the specific embodiment illustrated above, which represents only a non-limiting example of the scope of the invention, but that a number of variants are possible, all within the reach of a person skilled in the field, without departing from the scope of the invention.

For example, although independent guiding plates 8 have been illustrated, which are then fixed to central structure 4, the portion for the passage and fastening of the small chain can be made integrally with central structure 4.

Further, small chains 9 are preferably made of metal, but may also be made of different suitable, substantially rigid materials.

Finally, according to a preferred embodiment, an antishock or damping device is provided between each small chain 9 and the respective point of fastening on ring 7, which device avoids transferring to ring 7 and to the corresponding fastening means the vibrations originating from the rolling track.

The invention claimed is:

1. An attachment system for a snow chain comprising:
    an anti-skid rolling track (1, 2*a*, 2*b*, 12) joined to a plurality of connecting arms (3) converging towards and joined to a common central structure (4);
    a plurality of elastic ropes (5) forming elastic attachments between said plurality of connecting arms (3) and an anchoring ring (7) fixed to a rim (C) of a wheel; and
    at least one inextensible linear element (9) defining a rigidity constraint between plates (8) fixed on central structure 4 and said anchoring ring (7), a first end of said at least one inextensible linear element (9) is permanently fixed to a terminal hook (6) fastened to said anchoring ring (7), and said central structure (4) comprises at least a passage and fastening portion through which said at least one inextensible linear element (9) is guided and blocked.

2. The system as claimed in claim 1), wherein said terminal hook (6) engages said elastic ropes (5) with the anchoring ring (7).

3. The system as claimed in claim 2, wherein said central structure (4) comprises at least a passage and fastening portion through which said at least one inextensible linear element (9) is guided and blocked.

4. The system as claimed in claim 1), wherein said passage and fastening portion comprises a through-hole (8*a*) and a blocking fork (8*b*).

5. The system as claimed in claim 4, wherein said passage and fastening portion is provided at the joining of each arm (3) to the central structure (4).

6. The system as claimed in claim 4, wherein said passage and fastening portion is formed in a plate (8), said plate (8) applied and fixed to said central structure (4).

7. The system as claimed in claim 4, wherein said passage and fastening portions comprise at least two passage and fastening portions, one of the two passage and fastening portions engages an elastic holding element (10) provided at a second end of said at least one inextensible linear element (9) the other of the two passage and fastening portions engages an other end of the elastic holding element (10).

8. The system as claimed in claim 7, wherein said passage and fastening portion is provided at the joining of each arm (3) to the central structure (4).

9. The system as claimed in claim 7, wherein said passage and fastening portion is formed in a plate (8), said plate (8) applied and fixed to said central structure (4).

10. The system as claimed in claim 7, wherein a retaining hole (8*c*) is provided at the bottom of said fork (8*b*), in which hole an attachment ring of said elastic element (10) may be blocked.

11. The system as claimed in claim 10, wherein said passage and fastening portion is provided at the joining of each arm (3) to the central structure (4).

12. The system as claimed in claim 10, wherein said passage and fastening portion is formed in a plate (8), said plate (8) applied and fixed to said central structure (4).

13. The system as claimed in claim 1, wherein said passage and fastening portion is provided at the joining of each arm (3) to the central structure (4).

14. The system as claimed in claim 1, wherein said passage and fastening portion is formed in a plate (8), said plate (8) applied and fixed to said central structure (4).

15. The system as claimed in claim 1, wherein said at least one inextensible linear elements (9) are at least three, radially arranged across the wheel and mutually angularly equidistant.

16. A system as claimed in claim 1, wherein said inextensible element is a chain (9).

17. The snow chain according to claim 1, further comprising:
    an anti-skid rolling track (1, 2*a*, 2*b*), 12) joined to a plurality of connecting arms (3) converging towards said system of attachment to said wheel.

18. The system as claimed in claim 1, wherein said central structure (4) comprises at least a passage and fastening portion through which said at least one inextensible linear element (9) is guided and blocked.

* * * * *